US010196566B2

(12) United States Patent
Berner et al.

(10) Patent No.: US 10,196,566 B2
(45) Date of Patent: *Feb. 5, 2019

(54) PERSISTENT PHOSPHORESCENT COMPOSITE MATERIAL

(71) Applicant: Rolex SA, Genéve (CH)

(72) Inventors: Detlef Berner, La Conversion (CH); Romain Girod, Annemasse (FR); Olliver Pujol, Lausanne (CH); Isabelle Rigot, La Balme de Sillingy (FR)

(73) Assignee: Rolex SA, Genéve (CH)

( * ) Notice: Subject to any disclaimer, the term of this patent is extended or adjusted under 35 U.S.C. 154(b) by 147 days.

This patent is subject to a terminal disclaimer.

(21) Appl. No.: 15/004,209

(22) Filed: Jan. 22, 2016

(65) Prior Publication Data

US 2016/0137919 A1 May 19, 2016

Related U.S. Application Data

(62) Division of application No. 14/070,616, filed on Nov. 4, 2013, now Pat. No. 9,284,485.

(30) Foreign Application Priority Data

Nov. 7, 2012 (EP) .................................. 12191561

(51) Int. Cl.
*C04B 35/44* (2006.01)
*C04B 35/48* (2006.01)
(Continued)

(52) U.S. Cl.
CPC .......... *C09K 11/7792* (2013.01); *C04B 35/44* (2013.01); *C04B 35/48* (2013.01);
(Continued)

(58) Field of Classification Search
CPC . C09K 11/7792; C09K 11/025; C04B 35/488; C04B 35/6263; C04B 2235/3206;
(Continued)

(56) References Cited

U.S. PATENT DOCUMENTS 5,424,006 A * 6/1995 Murayama ......... C09K 11/7734
252/301.4 R
7,121,717 B2 10/2006 Grippo et al.
(Continued)

FOREIGN PATENT DOCUMENTS

EP 1588991 A1 10/2005
JP 2004-292588 * 10/2004
(Continued)

OTHER PUBLICATIONS

Espacenet machine translation for JP 2004-292588, Oct. 21, 2004.*
(Continued)

*Primary Examiner* — C Melissa Koslow
(74) *Attorney, Agent, or Firm* — Rankin, Hill & Clark LLP

(57) ABSTRACT

The invention relates to a persistent phosphorescent ceramic composite material which is a sintered dense body comprising two or more phases, a first phase consisting of at least one metal oxide and a second phase consisting of a metal oxide containing at least one activating element in a reduced oxidation state. The invention furthermore relates to a method for the preparation of a phosphorescent ceramic composite material as defined in any of the previous claims, the method comprising the following steps: preparing a mixture of a metal oxide and a phosphor; fabricating a green body from the mixture; and heat treating the green body in a reducing atmosphere.

16 Claims, 4 Drawing Sheets

Figure 1:
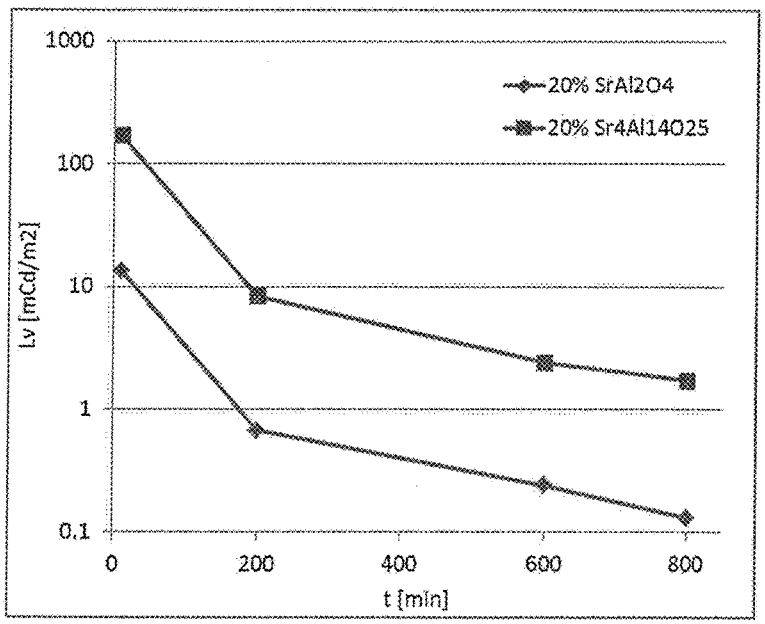

(51) Int. Cl.
*C09K 11/02* (2006.01)
*C09K 11/77* (2006.01)
*G04B 19/12* (2006.01)
*G04B 37/22* (2006.01)
*C04B 35/486* (2006.01)
*C04B 35/488* (2006.01)
*C04B 35/626* (2006.01)
*C04B 35/634* (2006.01)

(52) U.S. Cl.
CPC .......... *C04B 35/481* (2013.01); *C04B 35/486* (2013.01); *C04B 35/488* (2013.01); *C04B 35/4885* (2013.01); *C04B 35/6263* (2013.01); *C04B 35/62635* (2013.01); *C04B 35/62655* (2013.01); *C04B 35/634* (2013.01); *C09K 11/025* (2013.01); *G04B 19/12* (2013.01); *G04B 37/225* (2013.01); *C04B 2235/3206* (2013.01); *C04B 2235/3208* (2013.01); *C04B 2235/3213* (2013.01); *C04B 2235/3215* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3246* (2013.01); *C04B 2235/3436* (2013.01); *C04B 2235/3445* (2013.01); *C04B 2235/3454* (2013.01); *C04B 2235/3481* (2013.01); *C04B 2235/40* (2013.01); *C04B 2235/5436* (2013.01); *C04B 2235/5463* (2013.01); *C04B 2235/656* (2013.01); *C04B 2235/6567* (2013.01); *C04B 2235/6582* (2013.01); *C04B 2235/6583* (2013.01); *C04B 2235/661* (2013.01); *C04B 2235/664* (2013.01); *C04B 2235/76* (2013.01); *C04B 2235/762* (2013.01); *C04B 2235/765* (2013.01); *C04B 2235/77* (2013.01); *C04B 2235/80* (2013.01); *C04B 2235/96* (2013.01); *C04B 2235/9646* (2013.01); *C04B 2235/9661* (2013.01); *Y10T 428/24917* (2015.01); *Y10T 428/24926* (2015.01)

(58) Field of Classification Search
CPC .... C04B 2235/3217; C04B 2235/3232; C04B 2235/3241; C04B 2235/3244; C04B 2235/3246; C04B 2235/3205; C04B 2235/3215; C04B 2235/3213; C04B 2235/3208; C04B 2235/3222; C04B 2235/9646

See application file for complete search history.

(56) References Cited

U.S. PATENT DOCUMENTS

| | | | |
|---|---|---|---|
| 7,479,732 B2* | 1/2009 | Rossner | H01L 33/50 313/503 |
| 9,284,485 B2* | 3/2016 | Berner | C04B 35/44 |
| 2002/0063301 A1* | 5/2002 | Hanamoto | H01L 33/502 257/432 |
| 2006/0214134 A1* | 9/2006 | Masuda | C03C 3/089 252/301.4 F |
| 2015/0252260 A1* | 9/2015 | Berner | C09K 11/7792 428/209 |

FOREIGN PATENT DOCUMENTS

| | | |
|---|---|---|
| WO | 2006/097876 A1 | 9/2006 |
| WO | 2008/096301 A1 | 8/2008 |
| WO | 2010/024981 A1 | 3/2010 |

OTHER PUBLICATIONS

J-Plat Pat machine translation for JP 2004-292588, Oct. 21, 2004.*
Li Ruifang, "Studies on the Surface Modification and Application of SrAl2O4:Eu2+, Dy3+ Phosphor," Masteral dissertation, Dalian University of Technology, China (2009), three pages.
Gao et al., "Improved Performance of Strontium Aluminate Luminous Coating on the Ceramic Surface," Journal of Physics: Conference Series 152 (2009), four pages.
Van den Eeckhout et al., "Persistent Luminescence in Eu2+-Doped Compounds: A Review," Materials 2010, 3, pp. 2536-2566.
O. C. Standard et al. "Densification of Zirconia—Conventional Methods," Key Engineering Materials, vols. 153-154, (1998), pp. 251-300.
Professional English translation of JP 2004292588 published Oct. 21, 2004, 22 pages.
Lin et al., "Anomalous luminescence in Sr4Al14O25:Eu, Dy phosphors," Applied Physics Letters, vol. 81, No. 6, Aug. 5, 2002, three pages.

* cited by examiner

PERSISTENT PHOSPHORESCENT COMPOSITE MATERIAL

TECHNICAL FIELD

The present invention relates to a ceramic composite material which displays high mechanical strength and is capable to display a persistent phosphorescence, and to a method for preparing such ceramic composite material.

STATE OF THE ART

Zirconium dioxide (or zirconia, $ZrO_2$) is one of the most studied ceramic materials. $ZrO_2$ adopts a monoclinic crystal structure at room temperature and changes to tetragonal and cubic structures at higher temperatures. The volume expansion caused by the cubic to tetragonal to monoclinic transformation induces large stresses, and these stresses cause $ZrO_2$ to crack upon cooling from high temperatures. When the zirconia is blended with other oxides, the tetragonal and/or cubic phases are stabilized. Effective dopants include magnesium oxide (MgO), yttrium oxide ($Y_2O_3$, yttria), calcium oxide (CaO), and cerium oxide ($Ce_2O_3$).

Zirconia is often more useful in its phase 'stabilized' state. Upon heating, zirconia undergoes disruptive phase changes. By adding for example small percentages of yttria, these phase changes are minimized, and the resulting material has superior thermal, mechanical, and electrical properties. In some cases, the tetragonal phase can be metastable. If sufficient quantities of the metastable tetragonal phase are present, then an applied stress, magnified by the stress concentration at a crack tip, can cause the tetragonal phase to convert to monoclinic, with the associated volume expansion. This phase transformation can then put the crack into compression, retarding its growth, and enhancing the mechanical properties. This mechanism is known as transformation toughening, and significantly extends the reliability and lifetime of products made with stabilized zirconia.

It has been described by Drennan and Hanninck (J. A. Ceram. Soc. 1986; 69(7): 541-546) that the addition of SrO effectively neutralizes the detrimental effects of the $SiO_2$ contaminant in zirconia partially-stabilized with magnesia. It seems that this effect is obtained through the formation of a glass phase that comprises Si and Sr, which is ejected from the bulk of the ceramic during sintering.

Cutler and Virkar (J. A. Ceram. Soc. 1991; 74(1): 179-186) have shown that the addition of SrO and $Al_2O_3$ to Ce-doped zirconia leads to mechanical strengthening of the zirconia, through the formation of strontium aluminate platelets ($SrAl_{12}O_{19}$). This makes possible the production of tough Ce-zirconia with good hardness and strength. $SrAl_{12}O_{19}$ is also known to show persistent phosphorescent properties when appropriate rare-earth dopants are included in the material. However, the strontium aluminate phase described by Cutler and Virkar is not phosphorescent, presumably because the Ce is not incorporated into the strontium aluminate phase and the oxidation state is the non-active $Ce^{4+}$ state.

A composite « ceramic » material for optical conversion applications is described in EP 1 588 991 A1, one of the phases being a fluorescent phase. The examples in the document are focused on a composite of $Al_2O_3$ and Ce-doped $Y_3Al_5O_{12}$. The material is obtained by mixing the basis materials and subsequent «fusion» at 1900-2000° C. under vacuum, without any further heat treatment. The materials are described to convert blue light between 430 and 480 nm (such as the light emitted by a blue LED) into "white" light. To this end, the material transmits part of the emitted blue light, while another part is converted into yellow light by the $Y_3Al_5O_{12}$:Ce phase (broad emission spectrum centred around 530 nm). The resulting colour which appears as a white light can be adjusted by varying the thickness of the material.

Document WO 2006/097876 A1 describes a polycrystalline ceramic material that comprises a fluorescent material. Ideally, the ceramic is alumina and the phosphor is a Ce-doped YAG (such as $Y_3Al_5O_{12}$:$Ce^{3+}$). The ceramic material is intended to convert part of the blue light emitted by a LED into yellow light, in order to obtain white light. The material is obtained by mixing alumina and phosphor powders in a slurry, with subsequent pressing and HIP-sintering. The material comprises typically 80 to 99.99 vol. % alumina and 0.01 to 20 vol. % phosphor.

A further ceramic composite for optical conversion is described in WO 2008/096301 A1, where both luminescent and non-luminescent phases comprise Si and N. The application discloses in particular the realization of $BaSi_7N$ and $(Ba,Sr)_2Si_{5-x}Al_xN_{8-x}O_x$:Eu (obtained by sintering in reducing atmosphere and subsequent washing in acidic solution), the mixing of both components and HIP heat treatment at 1550° C. and 80 MPa, optionally followed by a heat treatment under $N_2$ at 1300° C.

In WO 2011/094404 A1 a ceramic for optical conversion is described with a fluorescent phase of YAG:Ce with pores of well-controlled size and shape. The formation of the pores is conducted through heat treatment whereby pore-forming additives are removed or burned out. The process consists in a first step of debinding by heating in air at typically 1150° C., followed by a second step of sintering in a wet hydrogen atmosphere at 1700-1825° C. Through this process a material with a high degree of transparency or translucency is obtained.

OBJECT OF THE INVENTION

There is no disclosure of a ceramic material, in particular a zirconia-based material, which comprises a persistent phosphorescent phase, in particular a persistent phosphorescent phase that still emits significant light intensity hours after having been excited. In different technical fields there is an interest in obtaining a material which displays a high mechanical stability and at the same time a persistent luminescence. For instance a persistent phosphorescent effect is required in applications for watches or for indicators, or as a luminous paint or pigment for e.g. safety applications.

It is an object of the present invention to obviate the disadvantages of the prior art. In particular it is an object of the present invention to provide a ceramic composite material which displays mechanical strength and is capable to display persistent phosphorescence.

It is a further object of the present invention to provide a method to obtain a ceramic composite material which displays mechanical strength and is capable to display persistent phosphorescence.

DESCRIPTION OF THE INVENTION

First, the persistent phosphorescent ceramic composite material is described.

A "persistent phosphorescent material" in the context of the present invention means a solid luminescent material which shows light emission after the exciting radiation has ceased, with an afterglow on the order of a few minutes to several hours. This includes, but is not necessarily limited to, solid luminescent materials which show long phosphorescence or long persistence corresponding to an afterglow persistent time over 500 minutes. The persistent time refers to the time that it takes for the afterglow to decrease to a luminance of 0.3 mCd/m$^2$, which is the lower limit of light perception of the human eye (see, e.g., the "Phosphor Handbook", S. Shionoya and W. M. Yen, editors, CRC Press 1999, chapter 12).

The persistent phosphorescent ceramic composite material is a dense body. The dense property of the persistent phosphorescent ceramic composite material provides the wanted enhanced phosphorescence performance and the favorable mechanical properties. What is understood to be a "dense" body will be described hereafter. In order to achieve the dense character of the persistent phosphorescent ceramic composite material the preparation comprises a densifying step leading to a densified body. The manner of the densifying step is described hereafter in the context of the method of the present invention.

It is important that the densified body has been sintered during its preparation, since without the appropriate manner of sintering the wanted effect of the present invention, in particular the effect of the persistent phosphorescence is not achieved. The appropriate manner of sintering or heat treatment will be described hereafter in the context of the method of the present invention.

The sintered solidified body comprises two or more phases, in particular two or more crystalline phases. The first phase, which is usually the phase which is present in the highest amount by weight, is the phase which is the basis for the mechanical properties, while the second phase is responsible for the phosphorescent properties of the ceramic composite material and shows the type of composition which is usually called a phosphor. The persistent phosphorescent ceramic composite material is a composite material. A "composite material" in the context of the present invention is a bulk composite which means that the two or more phases are not separated in different parts of the dense body. For example, the second phase does not form a thin layer or a coating on the first phase.

The first phase consists of at least one metal oxide. Any metal oxide may be chosen which displays a high level of mechanical stability. Accordingly the metal oxide may be selected from aluminium oxide, zirconium oxide, magnesium oxide, silicon oxide, titanium oxide, barium oxide, beryllium oxide, calcium oxide and chromium oxide.

Of the possible useful materials for the first phase zirconia is preferred. Zirconia is highly stable and displays excellent mechanical properties. The material is reliable by itself, but according to a preferred embodiment it is used in a stabilized form. This stabilization can be achieved through the presence of a further material in a specific amount. This further present stabilizing material may be selected from materials derived from cerium, magnesium and yttrium.

Ce-doped zirconia can be used, although an orange-coloured zirconia would be obtained after treatment in reducing atmosphere.

Mg-doped zirconia may be used as well, but a compromise would have to be made between the day colour of the composite, luminescence performances and mechanical properties.

It has turned out that, in the context of the present invention, the presence of yttria as a dopant in the zirconia leads to a high degree of mechanical stability and the yttria-doped zirconia is the preferred material for the first phase. Zirconia stabilized with yttria is for instance produced by the company Tosoh Corporation and a typical product which is particularly useful in the preparation of the ceramic composite material of the present invention is 3 mol % yttria stabilized tetragonal zirconia. From the point of view of the inventors, yttria-doped zirconia offers the best potential in terms of day colour, excellent persistence of the phosphor phase and very good mechanical properties.

Instead of zirconia, or of yttriated zirconia according to the preferred embodiment, alumina may be used as well as a further preferred species, but this may be less successful, since non-luminescent phases can be formed during sintering. Furthermore, the heat treatments which have to be conducted in the preparation of the phosphorescent ceramic composite material according to the present invention have to be performed at a higher temperature than for zirconia.

Zirconia may also be used in a doped form and/or with the addition of pigments to modify its day colour, provided that the zirconia has been stabilized.

The second phase of the ceramic composite material consists of a metal oxide which contains at least one activating element in a reduced oxidation state.

As the metal oxide material Ca, Ba, Sr and/or Mg-aluminates may be used, or Ca, Ba, Sr and/or Mg silicates, or Ca, and/or Sr aluminosilicates. The preferred metal oxide material in the context of the present invention is strontium aluminate. As such strontium aluminate $SrAl_2O_4$, $SrAl_4O_7$, $SrAl_{12}O_{19}$ or $Sr_4Al_{14}O_{25}$ may for example be used, whereby the most preferred type is $Sr_4Al_{14}O_{25}$. One of the advantages of $Sr_4Al_{14}O_{25}$ is the circumstance that it is insoluble in water, which may be an advantage in the method for the preparation of the ceramic composite material, since it allows to mill the powder in water and to atomize the resulting slurry. It is a further advantage that is stable at the usual sintering temperature of yttriated zirconia as the preferred embodiment of the metal oxide of the first phase.

The metal oxide of the second phase of the ceramic composite material is doped with at least one activating element. As such an activating element any of the rare earth elements La, Ce, Pr, Nd, Pm, Sm, Eu, Gd, Tb, Dy, Ho, Er, Tm, Yb and Lu may be chosen. The addition of any of these elements to the metal oxide of the second phase of the ceramic composite material, in particular to strontium aluminate as the preferred embodiment of the metal oxide of the second phase of the ceramic composite material, may lead to the wanted phosphorescent effect of the ceramic composite material. The preferred types of the activating elements are Eu and Dy and it has been found that the most preferred embodiment of the second phase is $Sr_4Al_{14}O_{25}$ doped with Eu and Dy ($Eu^{2+}/Dy^{3+}$ doped $Sr_4Al_{14}O_{25}$).

Other types of second phase material may be selected. However, the use of such other materials may lead to ceramic composite material with lower performance, since non-luminescent phases can be formed during sintering.

The amount of the at least one activating element in the metal oxide of the second phase can be chosen based on the effect which shall be achieved. A typical content of Eu in strontium aluminate as the metal oxide of the second phase is between 0.05 and 4%, preferably between 0.15 and 1% by weight (relative to the total weight of the second phase material). This low concentration of Eu leads to a white phosphor powder which does not display the usual yellowish tint which is usually obtained in commercially available phosphors, but retains a high luminescence and phosphorescence intensity, as exemplified in patent application EP 2 626 401 A1. This low concentration of Eu is also of interest for the final phosphorescent ceramic composite material according to the present invention intensity in the final phosphorescent ceramic composite material.

The amount of the at least one metal oxide of the first phase shall be 5 to 95%, relative to the total weight of the materials of the first and the second phase. In that case the amount of the metal oxide containing the at least one activating element of the second phase shall be 5 to 95%, also relative to the total weight of the materials of the first and the second phase. The preferred amount of the at least one metal oxide of the first phase shall be 40 to 95% by weight, the further preferred amount shall be 50 to 95% by weight and the most preferred amount shall be 50 to 80% by weight, in all these cases relative to the total weight of the materials of the first and the second phase, and the corresponding amounts of the metal oxide containing the at least one activating element of the second phase shall be 5 to 60% by weight, 5 to 50% by weight and 20 to 50% by weight, respectively, relative to the total weight of the materials of the first and the second phase.

The ceramic composite material which is finally obtained is a dense material. As will be described hereafter, the ceramic composite material is prepared in a manner that a binder material, which is usually present in the first step of preparing the green body as the precursor of the ceramic composite material, is removed, for example by a heating step, and pores are generated in this step of removing the binder material. These generated pores are subsequently eliminated in subsequent heating steps, as will be described in connection with the method for the preparation of the persistent phosphorescent ceramic composite material according to the present invention.

A "dense body" in the context of the present invention means a body which is essentially without remaining pores, in other words a body in which the porous character has been minimized. The dense body displays a density which is at least 90% of the theoretical maximum density. The theoretical maximum density is the density without any remaining pores. It can be estimated by taking into account each phase which is present and the relative concentration and the density of each phase.

The theoretical maximum density can be calculated based on the knowledge of the density values of the different components in the composite material. For example, in case of a composite material comprising 80% by weight of zirconia containing 3% mol of yttria as the preferred type of material for the first phase of the sintered solidified body and 20% by weight of $Sr_4Al_{14}O_{25}$ as the preferred embodiment of the second phase of the sintered solidified body the theoretical maximum density can be calculated as follows. Based on the density for the yttriated zirconia of 6.1 g/cm$^3$ and the density for $Sr_4Al_{14}O_{25}$ of 3.65 g/cm$^3$ a theoretical density for this composition of 5.38 g/cm$^3$ is calculated. With 30% by weight of $Sr_4Al_{14}O_{25}$ and 70% by weight of yttriated zirconia the calculated density value is 5.08 g/cm$^3$ and with 50% by weight of $Sr_4Al_{14}O_{25}$ and 50% by weight of yttriated zirconia the calculated density value is 4.57 g/cm$^3$. Such calculated values are an appropriate basis for the calculation of the density although it must be recognized that there is an aspect of uncertainty due to the circumstance that the measurement of the phase concentration is not precise and the different phases are not necessarily phase-pure.

It is a preferred embodiment for the dense body, that its density is at least 97% of the theoretical maximum density and a more preferred embodiment that the density is at least 98% of the theoretical maximum density.

Since, as mentioned above, there will be a step of removal of the binder material, for example through heating, the binder material itself will not be identified in the final sintered ceramic composite material.

Next the method for preparing the persistent phosphorescent ceramic composite material according to the present invention is described.

In a first step the materials for the ceramic composite material are mixed as powders.

The manner for mixing the materials is not particularly limited and any conventional mixing procedure may be used.

The process of the present invention comprises the mixing of the metal oxide and the phosphor powder, optionally with stabilizers and binders, and the subsequent shaping of a powder compact (hereafter designated the green body).

The metal oxide used in the process of the present invention is the metal oxide of the first phase of the ceramic composite material described above. The phosphor used in the process of the present invention is the metal oxide containing the at least one activating element of the second phase of the ceramic composite material as described above.

The binders which are optionally used in the preparation of the green body are not particularly limited and any material which is suitable in aiding the formation of the green body may be used. Regularly the binder material is an organic material and as such an organic material a polymer material such as, for example, polyethylene glycol (PEG), polyvinyl acetate (PVA), polytetrafluoroethylene, ethylene-vinyl acetate, polyethylethacrylate, or poly(methacrylate)-co-ethylene glycol dimethacrylate (PMMA) may be chosen.

The presence of such an organic binder makes the formation of the green body easier. Methods for preparing the green body include injection molding, tape casting, dry pressing, slip casting, gel casting, direct coagulation casting and extrusion.

Hereafter the green body is treated with heat in a number of different steps. It is a first optional step to treat the green body with heat in order to remove the binder material insofar as it has been present during the preparation of the green body. This is called the debinding step. In this debinding step, pores are generated through the removal of the binder material in the heat-treated green body.

When conducted by heating, the debinding step is usually conducted at a temperature of at least 450° C., preferably in an oxidizing atmosphere, the selected temperature and the selected atmosphere depending on the character of the binder material.

Alternatively and depending upon the nature of the binder material, the debinding step can be carried out by other means, such as for example catalytic debinding, or solvent-based debinding.

The debinding step is followed by a first sintering step. The first sintering step is conducted at a temperature in the range of typically 800 to 1600° C. It is the intention of the first sintering step to densify the material. This is achieved by an effect of the heating on the pores which are present, whereby an elimination of the pores is initiated. A preferred range for the temperature in the first sintering step may be the range between 850 and 1200° C., and a typical temperature chosen for first sintering is 900° C. It has been observed that presintering at high temperatures such as temperatures in the range of 1450 to 1500° C. can lead to a slightly decreased performance as a phosphorescent composite material.

The first sintering is preferably conducted in an oxidizing atmosphere. Such an oxidizing atmosphere is regularly an ambient atmosphere, meaning in the presence of air at normal ambient pressure. Instead of air, an enriched oxygen atmosphere may be used as well, but this has no technical advantage. The debinding and first sintering can be also conducted under neutral or reducing conditions, although tests have shown that this approach is less favourable.

It is possible to combine the two steps of debinding and the first sintering in one single step. The conditions of this single treatment step must comply with the requirements for debinding as well as for the sintering of the first step. This means that the treatment temperature must be chosen to be in a range which allows the removal of the organic binder material under formation of pores of suitable size, or that two temperatures are chosen for the debinding step and the first sintering step without cooling the material to room temperature in between the steps.

If the wanted effect is not achieved in the one single step, then the debinding and the sintering under oxidizing conditions are conducted in two separate steps, but a treatment in one single step is in general more favourable.

The first sintering step is followed by a second sintering step which is conducted under reducing conditions. The reducing conditions in the sense of the present invention are such conditions in which a reduction of the activating element or elements in the phosphor as the second phase of the ceramic composite material is achieved, but at the same time a reduction of the metal oxide in the first phase of the ceramic composite material is avoided.

A usual temperature condition for performing the second sintering step is the choice of a temperature in the range of 800 to 1600° C., with a preferred temperature of 1350 to 1550° C. and with a more preferred temperature of 1450 to 1500° C. The duration of the treatment at this temperature depends on the composition of the composite and the temperature which has been chosen. A regular treatment condition is a duration of the treatment of 3 hours at a temperature of 1450° C. This means that the effective temperature of 1450° C. is maintained at a constant level for this duration of 3 hours. The total heat treatment involves a ramp-up period involving a heating of for instance 150° C./h and a cooling period of for instance 4 hours.

The atmosphere for the second sintering step is a reducing atmosphere. Any type of atmosphere which succeeds in reducing the activating elements in the activated metal oxide phase can be chosen. A typical reducing atmosphere is an atmosphere of hydrogen in argon ($Ar/H_2$) or an atmosphere of hydrogen in nitrogen ($N_2/H_2$).

As an alternative to the treatment in the second sintering step under reducing conditions, a sintering under neutral conditions may be possible. In that case it is possible to realize a High Isostatic Pressing (HIP) treatment in neutral atmosphere (after having sintered the material and closed the porosity), or to use spark plasma sintering (SPS) under neutral atmosphere. In both cases, the overall effect is to reduce the material as such treatments are usually performed in graphite moulds. The colour of the zirconia may be affected under these heat treatments, since it may be reduced during this treatment as well, at least in a thin surface layer. It should however be possible to remove such grey or black colour by mechanical polishing or through heat treatment in oxidising atmosphere at T<900° C.

It has turned out that the sintering step under reducing conditions is the essential step in the preparation of the composite material with the wanted effects of displaying favorable mechanical properties in addition to a wanted degree of phosphorescent properties. Before the second sintering step under reducing conditions, the material does not display the properties of a phosphor and no luminescence is observed. At least one heat treatment in reducing or neutral atmosphere at a temperature of at least 800° C. is required to obtain a functional material.

The sintering step under reducing conditions leads to a reduction of the activating elements in the phosphor. It is an essential feature of the invention that this step in the preparation only reduces the activating elements in the second, phosphorescent phase of the ceramic composite material. If for instance the metal oxide in the first phase is zirconia, the reduction of the zirconia would lead to a changed color of this component. Zirconia has a white color, but the reduced form is grey-black which would normally be a highly unwanted color change. It is the surprising effect of the method of the invention that the sintering step under reducing conditions preferentially reduces the activating elements in the phosphorescent phase and not the further components which are present, and in particular not the material of the first phase.

That zirconia is not reduced is very surprising, since the literature indicates that a heat treatment of zirconia under reducing atmosphere at high temperatures results in a blackening of the ceramic. One possibility could be that the presence in the ceramic of an activating element which is more easily reduced than the $ZrO_2$, such as the rare earth element(s) ($Eu^{3+}$ for example) contained in the second phase, prevents the colour change of zirconia.

The sintering step under reducing conditions preferably optimizes the density of the composite material, whereby the density reaches a maximal value and the pores which have been generated during the debinding step are essentially eliminated and no remaining pores are detected in the final product. The maximum density level is obviously achieved under the circumstance of the complete elimination of the pores.

It is also possible according to a particularly preferred embodiment of the present invention to conduct the different heat treatments, namely the debinding step, the sintering under oxidizing conditions and the sintering under reducing conditions, in one single heating step. It has been described above that the sintering step under reducing conditions is the essential step in the preparation of the composite ceramic of the present invention. In a combined single heating step, this single heating step shall in the first place provide the sintering under reducing conditions. Although the possibility to conduct the heat treatments in one single step is technically and economically an attractive possibility, this possibility shall only work when the different functions of the heating steps can be achieved in the single heating step. In some cases, the function of the debinding step cannot be achieved under reducing conditions, in particular for certain binder materials.

In a final step the material can be further treated to obtain a desired esthetical or functional effect, for example by depositing layers on parts of the surface and/or in features by PVD and/or galvanic methods, as for instance described in EP 1 548 524 A1 and EP 1 548 525 A1, or by impregnation of the green body with metallic salt solutions.

Through the method of the present invention, a ceramic-ceramic composite with excellent mechanical properties and excellent persistent luminescence is obtained. The obtained material opens many possibilities in terms of performances and design, as it is tough, hard, and mechanically resistant. It can be used to realize, e.g., exterior parts (watch case, bezel) as well as interior elements (dial, luminescent indexes) of a watch.

FIGURES

FIG. 1. Intensity of emission Lv as a function of time t of phosphorescent materials according to the present invention comprising different phases of strontium aluminate with rare earth activating elements.

Figure 2:
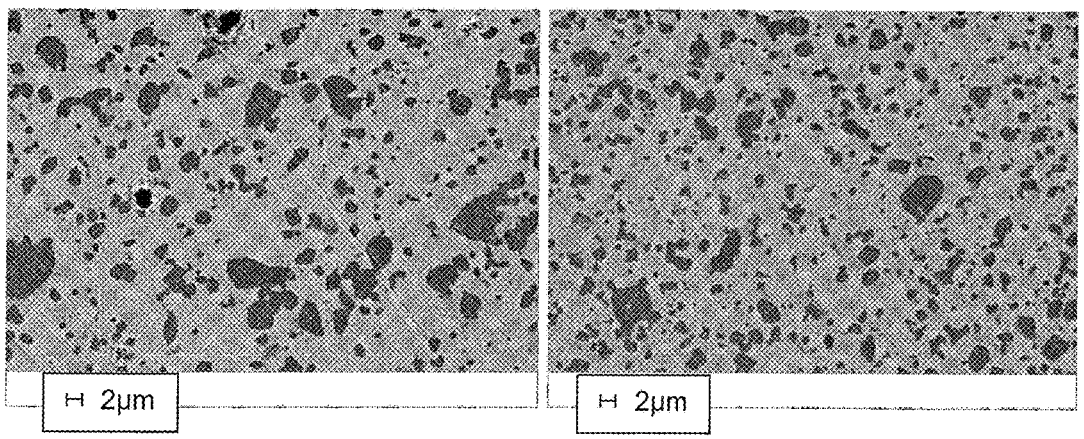

FIG. 2. Microstructures of two samples of inventive ceramic composite material realized with phosphorescent materials of standard and extrafine granulometry, respectively.

Figure 3:
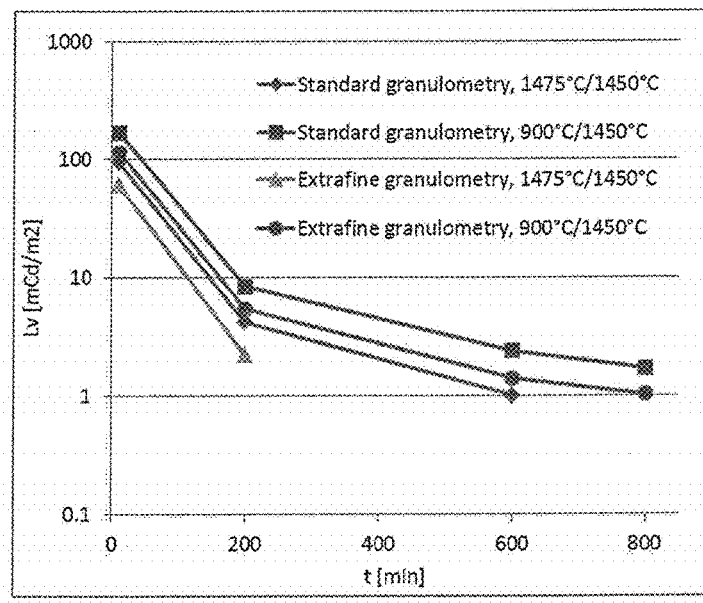

FIG. 3. Influence of initial phosphor grain size on luminescent properties of phosphorescent materials according to the present invention.

Figure 4:
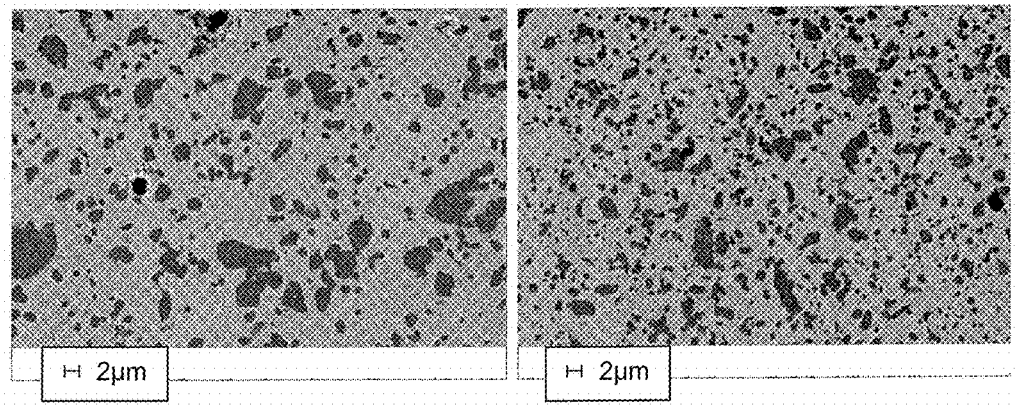

FIG. 4. Microstructures of two samples of phosphorescent composite material according to the present invention realized with phosphorescent materials without and with a washing step.

Figure 5:
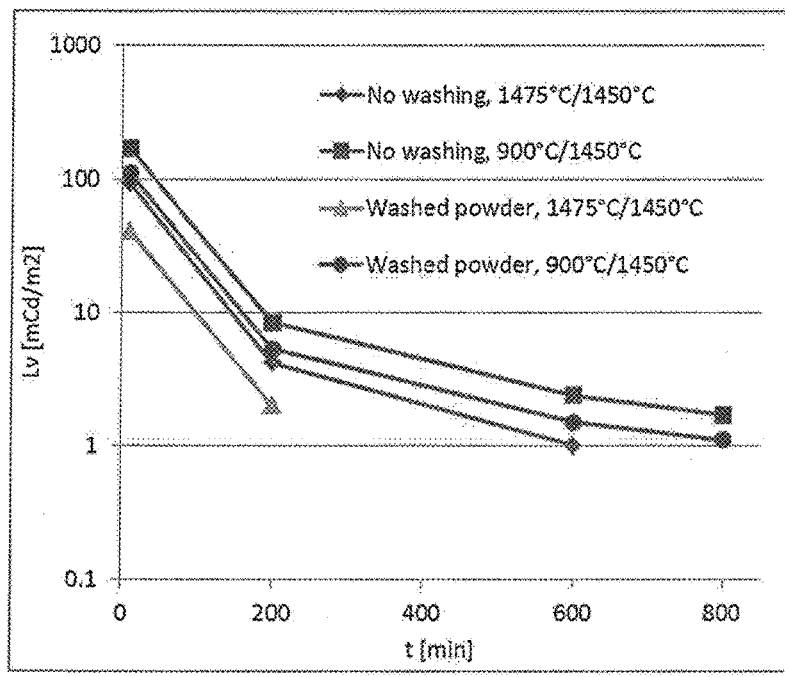

FIG. 5. Influence of washing step and treatment temperature on luminescent properties of phosphorescent materials according to the present invention.

Figure 6:
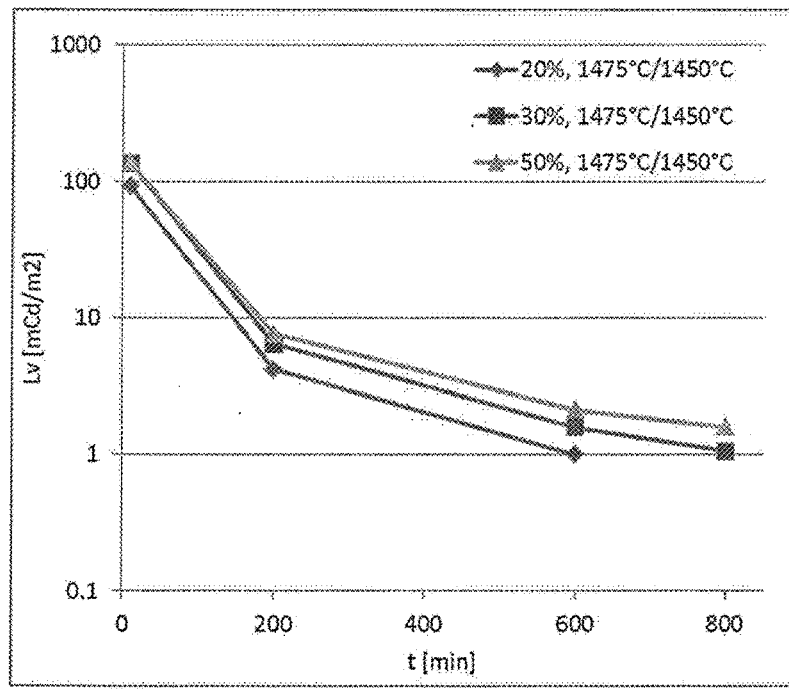

FIG. 6. Influence of phosphor concentration on luminescent properties of phosphorescent materials according to the present invention.

Figure 7:
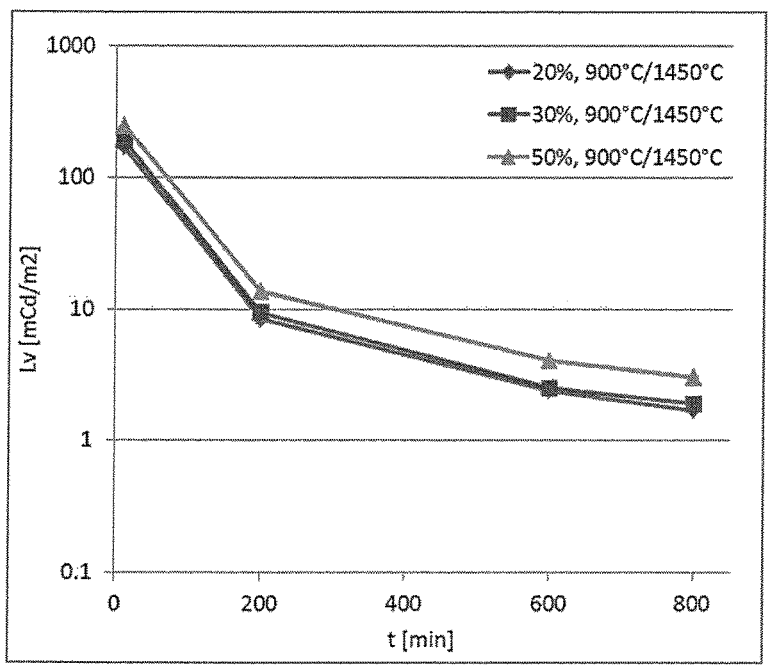

FIG. 7. Influence of phosphor concentration on luminescent properties of phosphorescent materials according to the present invention.

Figure 8:
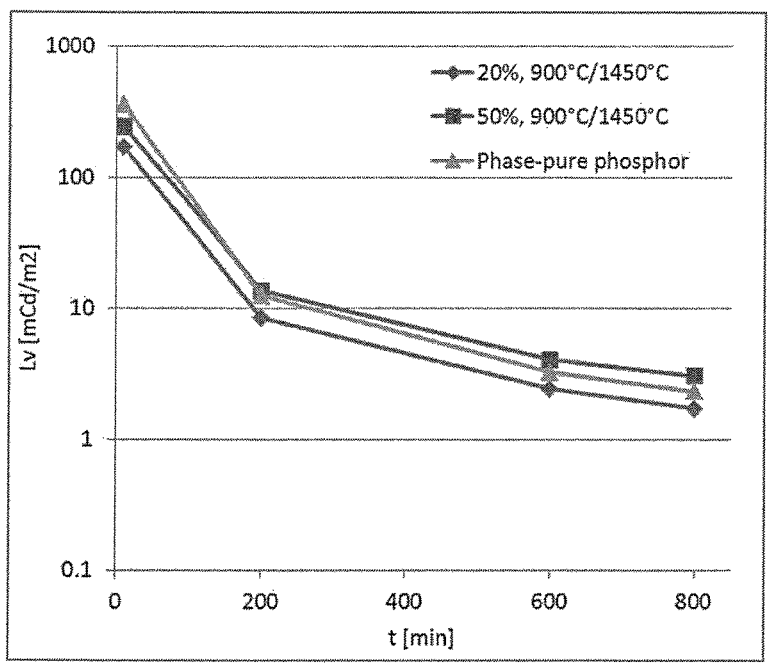

FIG. 8. Comparison of luminescent properties of phosphorescent materials according to the present invention with a pure phosphor sample.

EXAMPLES

Next the present invention is described in more detail by referring to the following examples.

Meanwhile the properties of the ceramic composite material were determined by the following methods.

The density is measured following Archimedes' method with absolute ethanol. Each sample is measured three times and the mean value is calculated.

L*a*b* colorimetry measurements are performed after machining and polishing the sample, on the free side (ie the side that was not in contact with the sample holder during heat treatment), with an aperture of 7 mm on three different locations. The equipment is a Minolta CM3610d.

The measurements of the toughness were performed by indentation with a KB250 Prüftechnik GmbH equipment. The HV5 indentations were realized under a charge of 5 kg applied during 15 s. The toughness was measured by indentation and evaluated through the formula proposed by K. Niihara (cf Niihara K., A fracture mechanics analysis of indentation induced Palmqvist crack in ceramics, J. Mater. Sci. Lett, 1983, 2, 221-223):

$$K_{Ic} = 0.018 H v a^{0.5} (E/Hv)^{0.4} \cdot (a/c-1)^{-0.5}$$

where E is the elastic (or Young's) modulus (measured value: 220 GPa), Hv is the Vickers hardness in GPa, c is the length of the crack formed following indentation measured from the center of the indentation, and a is the half-length of the diagonal of the indentation.

HV1 microhardness was measured with a LEICA VMHT MOT equipment with a charge of 1 Kg during 15 s. 10 measurements were performed per sample.

The Young's modulus and Poisson ratio were measured by acoustic microscopy (non-destructive control by ultrasounds). The relative measurement uncertainty is 2% for both parameters.

The intensity and decay of the emitted luminescence is measured in a black chamber on up to six samples with a Pritchard PR-880 photometer. The excitation of the phosphor prior to the measurement is done in the chamber with a standard fluorescent tube. The measurement is performed in three stages: (a) the sample is kept in the black chamber during 8 hours prior to charging; (b) the excitation is realized during 20 minutes under a D65 fluorocompact lamp at an excitation intensity of 400 lux; (c) the emitted luminescence is measured during at least 900 minutes with an objective aperture of 3°, one of the samples being a reference sample. The sensitivity of the photometer is 0.9 mCd/m$^2$, to be compared with 0.3 mCd/m$^2$, which is the lower limit of light perception of the human eye.

The X-ray diffraction measurements are performed in Bragg-Brentano geometry with a Cu anode excited with 45 kV electrons. The different phases are identified on the basis of reference patterns from the literature, and the phase concentrations (given in wt % in the tables below) are estimated with a typical accuracy of 1 wt %.

Example 1

A sample 1 containing 20 wt % of phosphor has been prepared as follows:

Mixing 80.0 g of zirconia powder containing 3 mol % of yttria (TZ-3YS obtained from TOSOH Corporation) and 20.0 g of $Sr_4Al_{14}O_{25}$: Eu,Dy powder with 3.0 g of organic binder composed of 1.2 g (40%) PVA and 1.8 g (60%) PEG 20 000 in solution at 50% in water, with 200 ml distilled water and 1 kg of zirconia balls;

Attrition/milling at 400 U/min during 30 min in a zirconia bowl;

Filtering of the suspension, rinsing of the balls and bowl with 450 ml IPA, spray-drying of the filtered suspension and rinsing liquid.

7 g of powder were then pressed in a Ø 40 mm mould. During a first heat treatment, debinding and sintering were performed in one step in a furnace under ambient atmosphere, at 1475° C., with a soak-time of 2 h with 21 h ramp-up time and 11 h cooling time (total treatment time of 34 h).

The obtained pellets were machined and polished. The typical density as measured by the Archimedes method was 5.371 g·cm$^{-3}$. Typical colorimetry was L*(D65)=97.01, a*(D65)=−1.81; b*(D65)=2.21. Phase analysis by X-ray diffraction indicated that the phase ratios of the zirconia (tetragonal to cubic) were not modified with respect to a phosphor-free sample, and that the phosphor remained in the $Sr_4Al_{14}O_{25}$ phase. At this stage, the phosphor was not functional and no persistent luminescence was detected.

The second heat treatment was performed in reducing atmosphere, at 1450° C. during 4 h with a ramp-up rate of 150° C.·h$^{-1}$, under Ar/H$_2$ atmosphere. After this treatment, the samples showed persistent luminescence. The density after treatment was 5.37 g·cm$^{-3}$ and the hardness of the pellet was about 1250 Hv with a toughness of about 5.1 MPa·m$^{-0.5}$. The colorimetry was L*(D65)=92.86, a*(D65)=−1.31, b*(D65)=2.53, very close to the colour before sintering

Example 2

Effect of the Strontium Aluminate Phase

The potential of two different strontium aluminates with rare-earth (RE) dopants to obtain a persistent phosphorescent ceramic material that is suitable, e.g., for watch applications was investigated.

Two phases showed suitable performances for such applications: the $Eu^{2+}/Dy^{3+}$ doped $SrAl_2O_4$ phase which emits around 520 nm (green) and the less used $Eu^{2+}/Dy^{3+}$ doped $Sr_4Al_{14}O_{25}$ phase which emits around 495 nm (blue). Although the green-emitting phase is most widely used, the blue-emitting material shows very interesting properties in terms of persistence and perceived intensity.

Two samples with 20% by weight of active SrAlO material were prepared in the manner as described in example 1, with a pre-sintering performed at 900° C. under air and a sintering in reducing atmosphere at 1450° C. for 3 h (sample 2.1 incorporating the green-emission $SrAl_2O_4$ material and sample 2.2 incorporating the blue-emission $Sr_4Al_{14}O_{25}$ material). The results are given in the following table 1 and in FIG. 1.

TABLE 1

| sample | Pre-sintering | sintering | Colour (LAB) | Density (g · cm−3) | $Sr_xAl_yO_z$ phases ($Sr_4Al_{14}O_{25}$/ $SrAl_2O_4$/ $SrAl_{12}O_{19}$) | $ZrO_2$ phases (tetragonal/ cubic/ monoclinic) |
|---|---|---|---|---|---|---|
| 2.1 | 900° C. in air | 1450° C. in $Ar/H_2$, 3 h | 93.9/−5.9/ 9.2 | 5.33 | 0/18/0 | 60/21/1 |
| 2.2 | 900° C. in air | 1450° C. in $Ar/H_2$, 3 h | 95.7/−3.5/ 6.3 | 5.33 | 18/0/0 | 60/21/1 |

The data prove that the sample with $Sr_4Al_{14}O_{25}$ showed an emitted intensity that is 10 times higher than for the green emitting material. Although $SrAl_2O_4$ can be functionally incorporated in a zirconia matrix, it is clearly preferable to use $Sr_4Al_{14}O_{25}$. However, the low performances of the $SrAl_2O_4$ containing samples could be due to some process steps. For example, as $SrAl_2O_4$ is water-soluble, it could be preferable not to use water-based methods for atomisation.

Example 3

Influence of $Sr_4Al_{14}O_{25}$ Grain Size and Sintering Conditions

The influence of the grain size of the initial phosphor material on the obtained performances was studied for two different sintering conditions.

The images in FIG. 2 show the microstructures of the samples with standard granulometry ($D_{V10}$=1.2 μm; $D_{V50}$=2.5 μm; $D_{V90}$=6.4 μm, as in the samples 3.1 and 3.2, at left) and so-called "extra-fine" granulometry ($D_{V10}$=0.1 μm; $D_{V50}$=1.4 μm, $D_{V90}$=4.7 μm, as in the samples 3.3 and 3.4, at right).

The behaviour of the four samples is displayed in table 2 and FIG. 3.

TABLE 2

| sample | Pre-sintering | sintering | Colour (LAB) | Density (g · cm$^{-3}$) | $Sr_xAl_yO_z$ phases ($Sr_4Al_{14}O_{25}$/ $SrAl_2O_4$/ $SrAl_{12}O_{19}$) | $ZrO_2$ phases (tetragonal/ cubic/ monoclinic) |
|---|---|---|---|---|---|---|
| 3.1 | 1475° C. in air | 1450° C. in $N_2/H_2$, 4 h | 94.8/−2.5/ 4.1 | 5.33 | 20/0/0 | 56/23/1 |
| 3.2 | 900° C. in air | 1450° C. in $N_2/H_2$, 3 h | 95.7/−3.5/ 6.3 | 5.33 | 20/0/0 | 56/23/1 |
| 3.3 | 1475° C. in air | 1450° C. in $N_2/H_2$, 4 h | 94.6/−2.2/ 3.2 | 5.35 | 18/0/0 | 60/21/1 |
| 3.4 | 900° C. in air | 1450° C. in $N_2/H_2$, 3 h | 95/−3/5 | 5.35 | 18/0/0 | 60/21/1 |

Although all four samples showed persistent luminescence, it is preferable in this case to use a strontium aluminate powder with standard grain size, as the samples with small powder grain size showed systematically a lower emitted intensity. Furthermore, it appears that pre-sintering at 900° C. is more favourable than at 1475° C. for the persistence. Samples with pre-sintering at 1500° C. were comparable to samples pre-sintered at 1475° C., and samples with sintering in reducing atmosphere at 1500° C. were comparable to samples sintered at 1450° C. (not shown here).

Example 4

Influence of $Sr_4Al_{14}O_{25}$ Pre-Treatment

The influence of a pre-treatment of the phosphor powder before incorporation into the zirconia slurry was studied for different sintering conditions. This pre-treatment consists in washing the powder in an aqueous acidic solution, such as, for example, a diluted solution of acetic acid (at a concentration of for instance 10% by mass) at a temperature of 70° C. for a few hours. It is known that the washing step leads to the removal of an amorphous phase from the powder preparation.

The images in FIG. 4 show the microstructures of the samples without washing (samples 3.1 and 3.2 of example 3, at left) and with an additional washing step (samples 4.1 and 4.2, at right).

The presentation in FIG. 5 summarizes the behaviour of the two types of samples, obtained each under two different conditions. In this figure, the two samples which have not been washed are the samples 3.1 and 3.2 described in the example 3.

The properties of two washed samples 4.1 and 4.2 are provided in the following table 3.

TABLE 3

| sample | Pre-sintering | sintering | Colour (LAB) | Density (g · cm$^{-3}$) | $Sr_xAl_yO_z$ phases ($Sr_4Al_{14}O_{25}$/ $SrAl_2O_4$/ $SrAl_{12}O_{19}$) | $ZrO_2$ phases (tetragonal/ cubic/ monoclinic) |
|---|---|---|---|---|---|---|
| 4.1 | 1475° C. in air | 1450° C. in $N_2/H_2$, 4 h | 88/−1.3/ 1.2 | 5.38 | 19/0/0 | 60/20/1 |
| 4.2 | 900° C. in air | 1450° C. in $N_2/H_2$, 3 h | 94.3/−3.1/ 4.6 | 5.38 | 19/0/0 | 60/20/1 |

Again, all samples show persistent luminescence, but a pre-treatment of the phosphor material leads to lower emitted intensities. This effect is not fully understood and could have several origins (difference in grain size, for example).

The results also confirm that pre-sintering at 900° C. is more favourable than an initial treatment at 1475° C. for the persistence. Samples with initial treatment sintered at 1500° C. were comparable to samples heated at 1475° C., and samples with sintering in reducing atmosphere at 1500° C. were comparable to samples sintered at 1450° C.

Example 5

Effect of the $Sr_4Al_{14}O_{25}$ Concentration

The influence of the concentration of $Sr_4Al_{14}O_{25}$ in the composite material was studied, with samples comprising 20% by weight, 30% by weight and 50% by weight of phosphor material.

The results of these experiments are displayed in the FIGS. 6 and 7. In the FIG. 6, the data for the sample with 20% by weight of phosphor material correspond to the data for the sample 3.1 in example 3. In the FIG. 7 the data for the sample with 20% of phosphor material correspond to the data for the sample 3.2 in example 3.

The properties of samples 5.1 and 5.2 with 30% by weight of phosphor material and samples 5.3 and 5.4 with 50% by weight of phosphor material are provided in the following table 4.

TABLE 4

| sample | Pre-sintering | sintering | Colour (LAB) | Density (g · cm$^{-3}$) | $Sr_xAl_yO_z$ phases ($Sr_4Al_{14}O_{25}$/ $SrAl_2O_4$/ $SrAl_{12}O_{19}$) | $ZrO_2$ phases (tetragonal/ cubic/ monoclinic) |
|---|---|---|---|---|---|---|
| 5.1 | 1475° C. in air | 1450° C. in $N_2/H_2$, 4 h | 96.3/−3.1/ 5.4 | 5.02 | 30/0/0 | 49/20/1 |

TABLE 4-continued

| sample | Pre-sintering | sintering | Colour (LAB) | Density (g·cm$^{-3}$) | $Sr_xAl_yO_z$ phases ($Sr_4Al_{14}O_{25}$/ $SrAl_2O_4$/ $SrAl_{12}O_{19}$) | $ZrO_2$ phases (tetragonal/ cubic/ monoclinic) |
|---|---|---|---|---|---|---|
| 5.2 | 900° C. in air | 1450° C. in $N_2/H_2$, 3 h | 96.2/–3.9/ 7.4 | 5.02 | Not measured | Not measured |
| 5.3 | 1475° C. in air | 1450° C. in $N_2/H_2$, 4 h | 93.7/–3.1/ 6.3 | 4.49 | 49/0/0 | 28/16/7 |
| 5.4 | 900° C. in air | 1450° C. in $N_2/H_2$, 3 h | 95.5/–5.0/ 8.8 | 4.48 | 50/0/0 | 33/15/2 |

All samples showed persistent luminescence. A higher phosphor concentration led to a marked increase of the emitted light intensity. Again, pre-sintering at 900° C. is more favourable than an initial treatment at 1475° C. for the persistence. Samples with initial treatment sintered at 1500° C. were comparable to samples heated at 1475° C., and samples with sintering in reducing atmosphere at 1500° C. were comparable to samples sintered at 1450° C. Sintering times of 3 h, 6 h and 9 h also yielded comparable results in terms of emitted luminescence.

The elastic (Young's) modulus decreases with increasing phosphor content, from 216 GPa for pure zirconia to 182 GPa for the sample with 50 weight % phosphor.

The Poisson ratio also tended to decrease with increasing phosphor content. The toughness was measured at 5.9 MPa·m$^{-0.5}$ and 3.9 MPa·m$^{-0.5}$ for 20% and 50% in weight of $Sr_4Al_{14}O_{25}$, respectively.

Finally, the FIG. 8 displays the emitted luminescence of the 20% and 50% phosphor-zirconia composites treated at 900° C. in air and then at 1450° C. in reducing atmosphere, in comparison with the emitted luminescence of a pure phosphor sample of the same type as used in example 1 and the further samples of the present application ($Sr_4Al_{14}O_{25}$ film of 160 μm thickness). Remarkably, the intensity is comparable at the outset, and is even higher after 200 minutes and more for the zirconia-phosphor sample than for the pure phosphor. This is an unexpected result and shows the tremendous potential of the approach of the inventors: a tough technical ceramic is obtained, with high tenacity and high elastic modulus, with luminescent properties that are equivalent to those of the pure phosphor powder.

It may be further noted that the measured luminescence is comparable on samples of 0.6 mm and 2 mm thicknesses.

The invention claimed is:

1. A phosphorescent ceramic composite material which is a sintered dense body consisting of:
a first phase consisting of zirconia and at least one selected from the group consisting of cerium, magnesium and yttrium, and
a second phase consisting of strontium aluminate and at least one dopant selected from the group consisting of europium and dysprosium, the dopant having a reduced oxidation state,
wherein the sintered dense body is produced by sintering the first phase and the second phase under oxidizing conditions, and then sintering the first phase and the second phase under reducing conditions.

2. The phosphorescent ceramic composite material according to claim 1, wherein the second phase is a $Eu^{2+}$/$Dy^{3+}$ doped $Sr_4Al_{14}O_{25}$ phase.

3. The phosphorescent ceramic composite material according to claim 1, wherein the amount of the first phase is 40 to 95% by weight and the amount of the second phase is 5 to 60% by weight, relative to the total weight of the two phases.

4. The phosphorescent ceramic composite material according to claim 1, wherein the amount of the first phase is 50 to 95% by weight and the amount of the second phase is 5 to 50% by weight, relative to the total weight of the two phases.

5. The phosphorescent ceramic composite material according to claim 1, wherein the amount of the first phase is 50 to 80% by weight and the amount of the second phase is 20 to 50% by weight, relative to the total weight of the two phases.

6. The phosphorescent ceramic composite material according to claim 2, wherein the amount of the first phase is 40 to 95% by weight and the amount of the second phase is 5 to 60% by weight, relative to the total weight of the two phases.

7. The phosphorescent ceramic composite material according to claim 2, wherein the amount of the first phase is 50 to 95% by weight and the amount of the second phase is 5 to 50% by weight, relative to the total weight of the two phases.

8. The phosphorescent ceramic composite material according to claim 3, wherein the amount of the first phase is 50 to 80% by weight and the amount of the second phase is 20 to 50% by weight, relative to the total weight of the two phases.

9. A sintered and heat treated phosphorescent ceramic composite material consisting of, prior to sintering and heat treating, a blend of:
a first phase consisting of zirconia and at least one selected from the group consisting of cerium, magnesium and yttrium, and
a second phase consisting of strontium aluminate and at least one dopant selected from the group consisting of europium and dysprosium, the dopant having a reduced oxidation state;
wherein the blend is sintered in a first step under oxidizing conditions and then sintered in a second step under reducing conditions.

10. The sintered and heat treated phosphorescent ceramic composite material according to claim 9, wherein the second phase is a $Eu^{2+}$/$Dy^{3+}$ doped $Sr_4Al_{14}O_{25}$ phase.

11. The sintered and heat treated phosphorescent ceramic composite material according to claim 9, wherein the amount of the first phase is 40 to 95% by weight and the amount of the second phase is 5 to 60% by weight, relative to the total weight of the two phases.

12. The sintered and heat treated phosphorescent ceramic composite material according to claim 9, wherein the amount of the first phase is 50 to 95% by weight and the amount of the second phase is 5 to 50% by weight, relative to the total weight of the two phases.

13. The sintered and heat treated phosphorescent ceramic composite material according to claim 9, wherein the amount of the first phase is 50 to 80% by weight and the amount of the second phase is 20 to 50% by weight, relative to the total weight of the two phases.

14. The sintered and heat treated phosphorescent ceramic composite material according to claim 10, wherein the amount of the first phase is 40 to 95% by weight and the amount of the second phase is 5 to 60% by weight, relative to the total weight of the two phases.

15. The sintered and heat treated phosphorescent ceramic composite material according to claim 10, wherein the amount of the first phase is 50 to 95% by weight and the amount of the second phase is 5 to 50% by weight, relative to the total weight of the two phases.

16. The sintered and heat treated phosphorescent ceramic composite material according to claim 10, wherein the amount of the first phase is 50 to 80% by weight and the amount of the second phase is 20 to 50% by weight, relative to the total weight of the two phases.

\* \* \* \* \*